Oct. 20, 1970 C. F. AULT 3,535,704

VERIFICATION OF MAGNETIC RECORDING

Filed Nov. 7, 1967 2 Sheets-Sheet 1

INVENTOR
C. F. AULT
BY D. E. Snedeker
ATTORNEY

United States Patent Office 3,535,704
Patented Oct. 20, 1970

3,535,704

VERIFICATION OF MAGNETIC RECORDING

Cyrus F. Ault, Wheaton, Ill., assignor to Bell Telephone Laboratories, Incorporated, Murray Hill, N.J., a corporation of New York Filed Nov. 7, 1967, Ser. No. 681,225
Int. Cl. G11b *5/02, 5/44*
U.S. Cl. 340—174.1 10 Claims

ABSTRACT OF THE DISCLOSURE

Verification of NRZ recording on an incremental magnetic tape recorder is accomplished by a read-after-write operation using the back voltage induced in the record transducer when the record signal opposes the pre-bias magnetization of the tape.

BACKGROUND OF THE INVENTION

This invention relates to magnetic recording systems and, more particularly, to a method and arrangement for verifying the recording of information by an incremental magnetic recorder.

In the recording of digital information on a magnetic surface, errors may be caused, for example, by imperfections in the magnetic surface, or by variations in the spacing or contact between the record transducer and the magnetic surface. Ideally, such errors should be detected immediately upon recording so as to permit the taking of appropriate action such as correction of the erroneously recorded information. A number of arrangements are known for performing this function with regard to the recording of information on non-incremental magnetic recorders. Unfortunately, however, considerable difficulty has been encountered heretofore in providing a simple, reliable and inexpensive method for verifying the proper recording of information on an incremental magnetic recorder.

In the past numerous attempts to solve this problem have met with only limited degrees of success. For example, in accordance with one known system, the current in the record transducer is monitored to determine whether or not the information to be recorded is being applied to the magnetic surface. This method does not give assurance, however, that the magnetic surface is properly responding to the signals applied by the record transducer.

According to another known incremental recording verification system, a test signal is first stored on the magnetic surface and is detected immediately thereafter by reverse stepping the magnetic surface. During the reverse step the test signal is sensed by the transducer so as to verify the proper recording thereof. Thereafter the magnetic surface is forward-stepped to record the desired information on the magnetic surface. This method, of course, does not monitor the actual information recorded and further suffers from the various disadvantages associated with having to first record a test signal and with having to reverse-step the magnetic surface.

It has also been proposed to use a transducer having a record gap and a read gap spaced apart along the path of the magnetic surface, the read gap sensing information recorded earlier by the record gap. Of necessity, however, the physical spacing between the record gap and the read gap must be typically fifty to one hundred bits along the magnetic surface. Consequently, the magnetic surface must be stepped a considerable number of increments, on the order of fifty or more, before the recorded information can be verified. Moreover, the accuracy required for the stepping mechanism in such a verification system makes it extremely costly.

SUMMARY OF THE INVENTION

Accordingly, a general object of this invention is to provide verification of recording by an incremental magnetic recorder without the disadvantages of known arrangements.

Another object of this invention is to provide simple, reliable and inexpensive verification of recording by an incremental magnetic recorder immediately after recording, requiring a minimum of modification of the operation and circuitry of the incremental recorder.

A further object of the invention is to provide simple, reliable and inexpensive verification of incremental magnetic recording in the non-return-to-zero (NRZ) mode, without modifying or terminating the NRZ recording signal.

In an illustrative incremental magnetic tape recorder embodiment of the present invention, the above and other objects are attained by effecting verification immediately after recording, using a single gap transducer for both recording and verification. When the recording current applied to the transducer opposes a bias magnetization previously applied to the tape, I have found that a magnetic transition occurs on the tape upstream from the transducer. As the tape is advanced incrementally the transition moves toward the head causing a change in flux therethrough. According to a feature of my invention, this flux change is detected and utilized advantageously for recording verification. No modification of the transducer or the recording circuitry is required, nor is it necessary to alter the recording operation in any manner. Simple, well-known readout circuitry is connected to the transducer for detecting the flux change, providing verification of recording.

BRIEF DESCRIPTION OF THE DRAWING

The above and other objects and features of the invention may be fully apprehended from the following detailed description and the accompanying drawing in which.

DETAILED DESCRIPTION OF THE INVENTION

Figure 1:
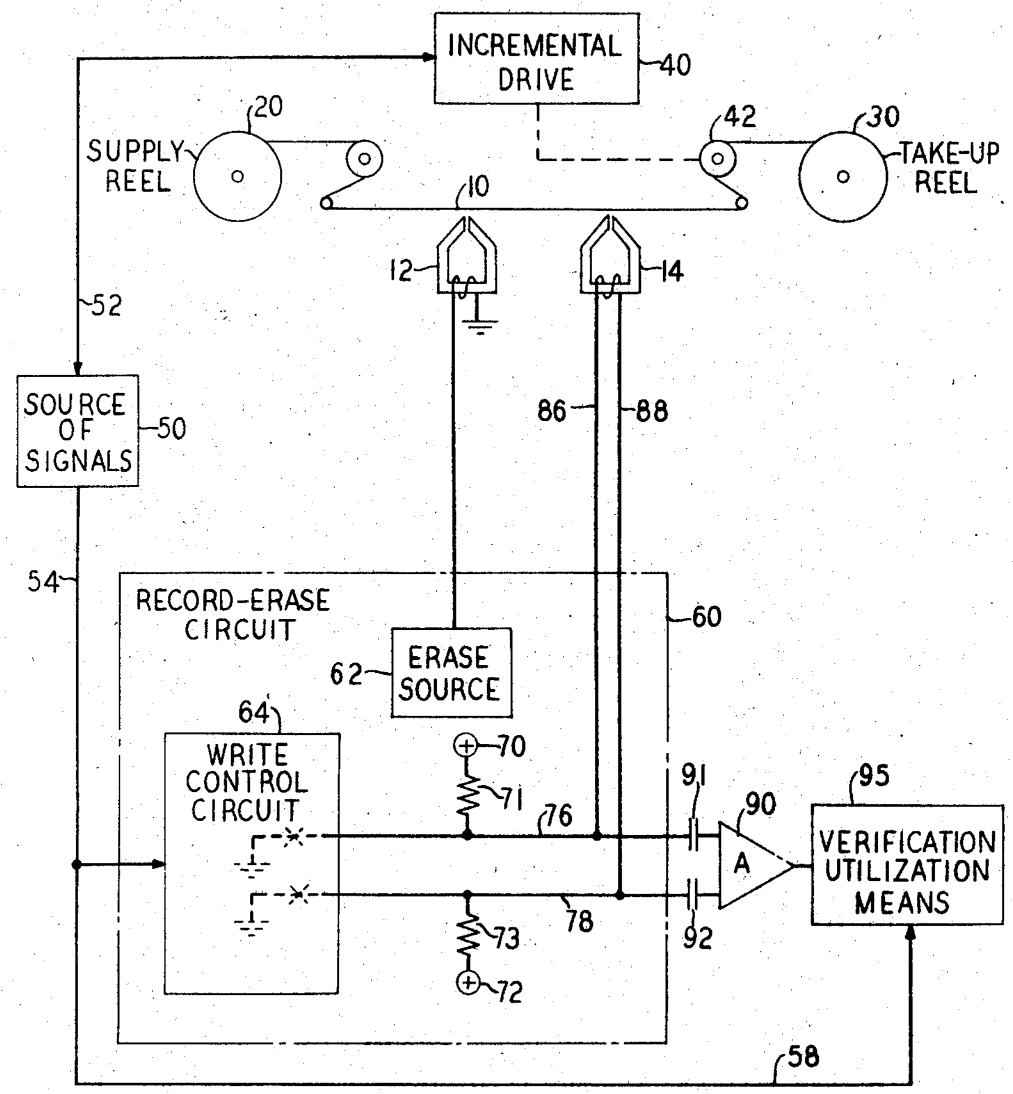
FIG. 1 is a block diagram representation of an illustrative embodiment of an incremental magnetic tape recorder arranged for recording verification in accordance with the principles of my invention.

For the purpose of description of the invention, the illustrative embodiment shown in FIG. 1 of the drawing depicts an incremental recorder utilizing magnetic tape as the information storage medium. The incremental recorder in FIG. 1 is assumed to record information in the NRZ mode and is assumed to record on-the-fly, that is, to record during incremental stepping of the tape. It will be apparent, however, from the description below that the present invention may be readily employed in connection with other types of incremental magnetic recorders, utilizing other than magnetic tape as a storage medium for example, or performing the recording operation while stopped rather than on-the-fly.

The incremental recorder in FIG. 1 comprises a conventional magnetic record transducer 14 situated adjacent magnetic track 10 such that the single signal translating gap of transducer 14 is in recording relationship with track 10. Magnetic track 10 moves longitudinally from left to right in FIG. 1 along a path adjacent transducer 14 between supply reel 20 and take up reel 30. The movement of track 10 along this path is effected in substantially equal incremental steps under control of incremental drive 40 coupled to driving capstan 42. Control path 52 connects incremental drive 40 to source of signals 50 to control the application of driving energy to capstan 42, and thus track 10, in accordance with the presentation of signals by source 50 to be recorded.

Incremental drive 40 may comprise any of the various known forms of incremental transport mechanisms, such as ratchet and pawl mechanisms, impulse clutch mechanisms and the like, for advancing track 10 in substantially equal step increments. For example, the step increments may be on the order of five mils for a bit packing density on track 10 on the order of 200 bits per inch.

Source of signals 50 is coupled over lead 54 to record transducer 14 through record-erase circuit 60 and may include any source presenting signals on lead 54 to be recorded serially on magnetic track 10. The signals presented on lead 54 by source 50 may comprise, for example, asynchronous or randomly appearing binary digits of information, drive 40 responding to each digit presented by source 50 to step track 10 incrementally for recording the digit.

Record-erase circuit 60 is responsive to the information signals presented on lead 54 for providing suitable corresponding signals over leads 86 and 88 to transducer 14 to effect recording of the signals on track 10 in the NRZ mode. By way of example, record-erase circuit 60 includes write control circuit 64 and a pair of potential sources 70 and 72. Source 70 is connected via resistor 71 over lead 76 to lead 86, and source 72 is similarly connected through resistor 73 over lead 78 to lead 88. Write control circuit 64 connects ground potential to one of leads 76 and 78 at all times, current flowing over the other of leads 76 and 78 providing a recording signal to transducer 14 for saturating a portion of track 10 adjacent transducer 14.

In accordance with the NRZ mode of recording assumed for the embodiment of FIG. 1, a reversal of the magnetic saturation of track 10, either from a + to a − or from a − to a +, represents a digit of one binary character, such as binary "1," while the continuation of the magnetic saturation in the same polarity represents a digit of the other binary character, such as binary "0." Thus, for example, assume that ground potential is connected to lead 76 by write control circuit 64, current accordingly flowing from source 72 through resistor 73 over leads 78 and 88 through the winding of transducer 14 over leads 88 and 76 to ground potential. If a binary zero is presented on lead 54 for recordation, this current flow and consequent polarity of magnetic saturation of track 10 is continued through the incremental stepping of track 10 to record the digit. If, on the other hand, a binary one is presented on lead 54 for recording on track 10, write control circuit 64 removes ground potential from lead 76 and connects ground potential to lead 78, thereby switching the direction of current flow through the winding of transducer 14 and consequently reversing the polarity of magnetic saturation of track 10 during the incremental stepping thereof. This latter current path may be traced from source 70 through resistor 71 over leads 76 and 86 through the winding of trandsucer 14 over leads 88 and 78 to ground.

Record-erase circuit 60 further includes an erase source 62 which is connected to erase transducer 12 positioned adjacent track 10 upstream from record transducer 14. The function of erase source 62 and erase transducer 12 is to place a pre-bias magnetization on track 10, that is, to saturate track 10 in a predetermined polarity direction prior to its passing adjacent record transducer 14. For example, track 10 may be saturated thereby in a negative polarity direction, as assumed herein for the purposes of illustration.

For recording verification in accordance with the principles of my invention, the inputs of readout amplifier 90 are coupled to leads 76 and 78, the output of amplifier 90 being connected to verification utilization means 95. Amplifier 90 comprises well-known readout amplifier circuitry and advantageously is alternating-current coupled to leads 76 and 78, such as via capacitors 91 and 92. Verification utilization means 95 includes known circuitry for utilizing the recording verification signals from amplifier 90 in accordance with the particular system application employing my verification method. Utilization means 95, for example, may provide an alarm, terminate recording, or initiate corrective action when the verification signals indicate that the information signals recorded on track 10 differ from those presented by source 50 on lead 54 for recording. The information signals on lead 54 are extended to verification utilization means 95 for recording verification purposes via lead 58.

Figure 2:
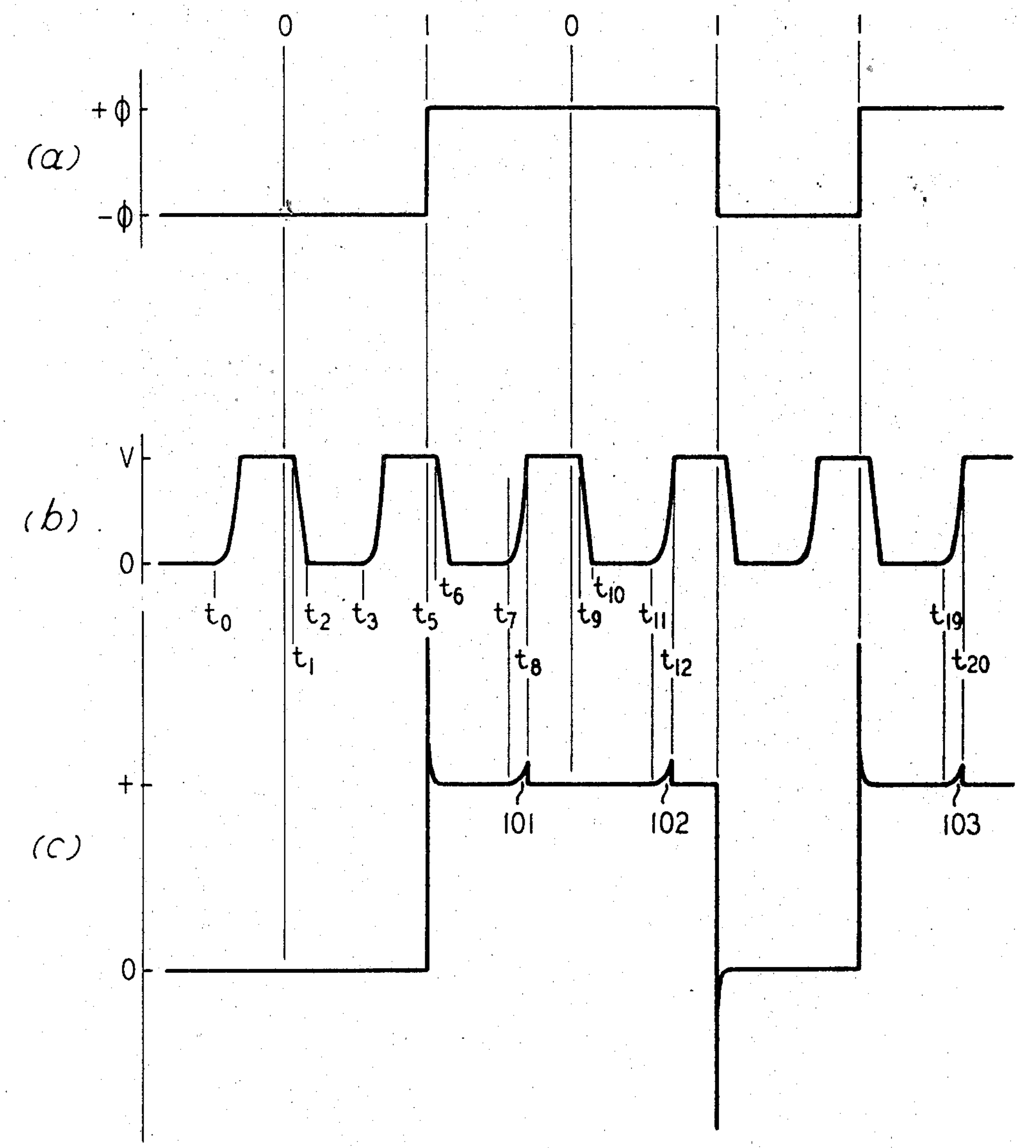
FIG. 2 is a time chart useful in describing the operation of the illustrative embodiment of FIG. 1.

The operation of the arrangement in FIG. 1 in executing the method of verification according to my invention may be better understood by reference to the time chart of FIG. 2. A typical NRZ magnetic flux pattern on track 10 is depicted in FIG. 2(*a*). As can be seen from FIG. 2(*a*), track 10 resides at all times in a saturated condition in either one or the other magnetic polarities represented by the usual symbols + and − in the drawing. The polarity of magnetic saturation of track 10 is continued for recording a binary "0" and is reversed for recording a binary "1." Thus, the typical recorded binary informaton pattern depicted in FIG. 2 between times $t_0$ and $t_{19}$ is "01011." Although not shown in FIG. 2, as mentioned above it is assumed herein that track 10 is saturated by erase transducer 12 in a negative polarity direction prior to track 10 passing adjacent transducer 14.

The incremental stepping movement of magnetic track 10 under the control of incremental drive 40 is depicted in FIG. 2(*b*), the movement of track 10 varying between zero velocity and velocity V during recording operation. Track 10 is normally stopped. When a digit is presented for recording, incremental drive 40 accelerates track 10 to velocity V for recording the digit and then brakes track 10 to a stopped condition. During the interval between times $t_7$ and $t_8$ in FIG. 2(*b*), for example, track 10 is accelerated from a stopped condition to velocity V. The velocity V is maintained during the interval between times $t_8$ and $t_9$ for recording the binary digit "0," and at time $t_9$ the movement of track 10 is braked to return track 10 to a stopped condition shown as occurring at time $t_{10}$ in FIG. 2(*b*).

The signal appearing on lead 76 to readout amplifier 90 is depicted in FIG. 2(*c*), the complement of this signal appearing on lead 78. When the recording current applied to record transducer 14 on leads 76 and 78 opposes the pre-bias magnetization applied to track 10 by transducer 12, I have found that a magnetic transition occurs on track 10 upstream from transducer 14. As track 10 is advanced incrementally the transition moves toward transducer 14 causing a change in the flux through transducer 14. This flux change through transducer 14 is sensed in accordance with my invention and utilized advantageously for recording verification. No modification of record transducer 14 or the recording circuitry is required, nor is it necessary to alter the recording operation in any manner. The recording verification signals appear in the form of pulses, such as pulses 101, 102 and 103 in FIG. 2(*c*), which are detected and amplified by amplifier 90 and applied to verification utilization means 95.

Consider now the operation of the embodiment of FIG. 1 in incrementally recording the typical information pattern depicted in FIG. 2. Just prior to time $t_0$, track 10 is assumed to be stopped and the portion of track 10 adjacent record transducer 14 is assumed to be saturated in the negative polarity direction, current flowing through transducer 14 from source 72 to ground potential on lead 76. At time $t_0$ source 50 presents a binary "0" on lead 54 to be recorded and via path 52 energizes incremental drive 40. Drive 40, through capstan 42, accelerates track 10 up to velocity V and maintains movement of track 10 at velocity V for a brief interval of time; and at time $t_1$ capstan 42 is braked by drive 40 to halt movement of track 10. Thus, during the interval of time between $t_0$ and $t_2$ track 10 is stepped forward a predetermined increment, for example, five mils. Inasmuch as the digit to be recorded is a binary "0," the existing current flow through transducer 14 is maintained during this interval to saturate the stepped increment of track 10 in the negative direction, as shown in FIG. 2(*a*).

Track 10 remains stopped until at some subsequent time, such as time $t_3$, when source 50 presents another binary digit on lead 54, illustratively a binary "1," to be recorded. Track 10 is again accelerated to velocity V and, while it is moving at this velocity, at time $t_5$ in FIG. 2, write control circuit 64 reverses the ground connection removing ground from lead 76 and connecting ground to lead 78. The current flow through transducer 14 is thereby reversed, in turn reversing the magnetization saturation polarity of track 10. Shortly thereafter, at time $t_6$, track 10 is braked to a stop.

At this point, then, the current flow through record transducer 14 opposes the negative pre-bias magnetization of track 10. When the next digit is presented for recordation and track 10 is accelerated toward velocity V, at time $t_7$ in FIG. 2, the opposition of the transducer current flow to the track pre-bias magnetization produces a flux change in transducer 14. This flux change in turn generates recording verification pulse 101 on lead 76 which is applied by readout amplifier 90 to readout verification means 95.

Subsequent digits of information presented on lead 54 are recorded incrementally in a similar manner. Each time track 10 is stepped incrementally with the current flowing through record transducer 14 opposing the pre-bias magnetization of track 10, such as at times $t_{11}$–$t_{12}$ and $t_{19}$–$t_{20}$, recording verification pulses such as pulses 102 and 103 are applied by readout amplifier 90 to verification utilization means 95. The recording verification pulses are thus generated in a pattern corresponding to odd-ones parity, that is, a pulse is generated each time track 10 is accelerated if the information previously recorded on track 10 contains an odd number of binary "1's." Accordingly, verification utilization means 95 may advantageously comprise simple parity checking circuitry employing the verification pulses, such as pulses 101, 102 and 103, to verify proper recording of the information on track 10.

Although the present invention has been described in terms of recording on a single channel magnetic track with a single record transducer, it will be recognized that the invention is equally applicable to recorders having a plurality of parallel channels and a corresponding plurality of record transducers. In parallel channel incremental recorders the verification method described above is employed substantially simultaneously in connection with each channel.

What is described hereinabove, therefore, is a novel method and arrangement for verifying recording on an incremental recorder immediately after recording. It is to be understood that the particular arrangements described above are but illustrative of the application of the principles of the invention. Numerous other arrangements may be devised by those skilled in the art without departing from the spirit and scope of the invention.

What is claimed is:

1. A method of verifying the proper recording operation of a magnetic recorder having a conventional narrow gap transducer for recording signals on an incrementally stepped magnetic storage medium, comprising the steps of magnetizing the recorder storage medium in a predetermined manner prior to the recording of signals thereon, and sensing the change in flux generated in said transducer during the incremental stepping of said storage medium relative to said transducer when the recording signal opposes the predetermined magnetization of said storage medium.

2. A method of verifying the proper recording operation of a magnetic recorder in accordance with claim 1 wherein said magnetizing step comprises saturating said storage medium in a predetermined magnetic polarity direction.

3. A method of verifying the proper recording operation of a magnetic recorder in accordance with claim 2 wherein said sensing step comprises sensing the change in flux generated in said transducer during the incremental stepping of said storage medium when the recording signal applied to said transducer opposes said predetermined magnetic polarity of said storage medium.

4. A method of verifying the proper recording operation of a magnetic recorder in accordance with claim 1 wherein said signals are recorded on said storage medium by selectively reversing the polarity of current in a record winding of said transducer while said storage medium is stepped incrementally, said magnetizing of said storage medium prior to the recording of signals thereon providing said storage medium with a predetermined magnetic saturation polarity, and said flux change generated in said transducer being a back voltage produced during the incremental stepping of said storage medium while the polarity of the current in said transducer record winding opposes said predetermined magnetic saturation polarity, the sensing of said back voltage providing recording verification signals.

5. A method of verifying the proper recording operation of a magnetic recorder in accordance with claim 4 further comprising utilizing said recording verification signals in conjunction with said recording signals for verifying the proper recording operation of said recorder.

6. In combination, a magnetic tape, narrow gap transducer means positioned in recording relationship adjacent said tape, means for advancing said tape incrementally past said transducer means, means for magnetizing said tape in a predetermined manner prior to the advancement of said tape past said transducer means, means for applying information recording signals to said transducer means during each incremental advancement of said tape, and recording verification means including readout means connected to said transducer means and operative during recording of information on said tape, the recording of information on said priorly magnetized tape providing readout signals verifying proper recording operation.

7. A magnetic recorder comprising a magnetic storage medium; means for stepping said medium in a forward direction in discrete increments; first narrow gap transducer means disposed in recording relationship with said medium; means for applying recording signals to said first transducer means; and means for verifying the proper recording operation of said recorder, said verifying means comprising, means for magnetizing said storage medium in a predetermined manner prior to the recording of signals thereon, said magnetized storage medium generating a flux change in said first transducer means during operation of said stepping means when the recording signals applied to said first transducer means oppose the predetermined magnetization of said storage medium, and readout means connected to said first transducer means for sensing said flux change.

8. A megnetic recorder in accordance with claim 7 wherein said magnetizing means comprises second transducer means disposed in recording relationship with said storage medium and positioned relative to said first transducer means such that said storage medium passes adjacent said second transduecr means prior to passing adjacent said first transducer means, and means for applying current to said second transducer means to saturate said storage medium in a predetermined magnetic polarity direction.

9. A magnetic recorder in accordance with claim 7 wherein said sensing means comprises readout amplifier means coupled to said first transducer means.

10. A magnetic recorder in accordance with claim 8 wherein said recording signal applying means comprises means for continuously applying current to said first transducer means and for selectively reversing the polarity of said current during the operation of said stepping means, said flux change in said first transducer means being generated during the acceleration of said storage medium by the operation of said stepping means when the polarity of the current applied to said first transducer means opposes the predetermined magnetic polarity of said storage medium.

References Cited

UNITED STATES PATENTS

| | | | |
|---|---|---|---|
| 2,789,026 | 4/1957 | Nordyke ---------- | 340—174.1 |
| 3,251,046 | 5/1966 | Ragle et al. -------- | 340—174.1 |
| 3,359,548 | 12/1967 | Yoshii et al. ------- | 340—174.1 |
| 3,368,211 | 2/1968 | Taris ------------ | 340—174.1 |

JAMES W. MOFFITT, Primary Examiner

W. F. WHITE, Assistant Examiner

U.S. Cl. X.R.

346—74